US012630198B2

(12) United States Patent　　　(10) Patent No.: US 12,630,198 B2

Fischer et al.　　　　　　　　　　(45) Date of Patent: May 19, 2026

(54) CONTROL DEVICE AND CONTROL METHOD FOR CONTROLLING ONE OR MORE SLIP-PROTECTION SYSTEMS AND ONE OR MORE SYSTEMS FOR OUTPUTTING ADHESION-OPTIMIZING MEANS IN RAIL VEHICLES

(71) Applicant: KNORR-BREMSE SYSTEME FÜR SCHIENENFAHRZEUGE GMBH, Munich (DE)

(72) Inventors: Marcus Fischer, Munich (DE); Thomas Rasel, Höhenkirchen-Siegertsbrunn (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 674 days.

(21) Appl. No.: 18/016,149

(22) PCT Filed: Jul. 7, 2021

(86) PCT No.: PCT/EP2021/068784

§ 371 (c)(1),
(2) Date: Jan. 13, 2023

(87) PCT Pub. No.: WO2022/013030

PCT Pub. Date: Jan. 20, 2022

(65) Prior Publication Data

US 2023/0286553 A1　　Sep. 14, 2023

(30) Foreign Application Priority Data

Jul. 13, 2020　(DE) .................... 10 2020 118 361.5

(51) Int. Cl.

| | |
|---|---|
| *B61C 15/10* | (2006.01) |
| *B60B 39/02* | (2006.01) |
| *B60B 39/04* | (2006.01) |
| *B60B 39/10* | (2006.01) |
| *B60T 8/17* | (2006.01) |
| *B60T 8/32* | (2006.01) |
| *B60T 17/22* | (2006.01) |
| *B61H 11/00* | (2006.01) |

(52) U.S. Cl.

CPC .............. *B61C 15/10* (2013.01); *B60B 39/02* (2013.01); *B60B 39/021* (2013.01);
(Continued)

(58) Field of Classification Search

CPC ..... B61C 15/10; B61C 15/102; B61C 15/105; B61C 15/107; B60B 2900/721;
(Continued)

(56) References Cited

U.S. PATENT DOCUMENTS

| | | | | | |
|---|---|---|---|---|---|
| 2,208,739 | A | * | 7/1940 | Hines ................... | B61H 11/005 318/52 |
| 5,428,538 | A | * | 6/1995 | Ferri .................... | B61C 15/107 318/52 |

(Continued)

FOREIGN PATENT DOCUMENTS

| | | |
|---|---|---|
| CN | 106740900 A | 5/2017 |
| CN | 110626362 B | 12/2020 |

(Continued)

OTHER PUBLICATIONS

International Search Report and Written Opinion corresponding to PCT/EP2021/068784 dated Oct. 29, 2021.

*Primary Examiner* — S. Joseph Morano
*Assistant Examiner* — James William Jones
(74) *Attorney, Agent, or Firm* — Barnes & Thornburg LLP

(57) ABSTRACT

A control system and a control method receive, process and exchange information relating to at least one slip-protection system and a unit for outputting adhesion-optimizing material, such as sand, in a rail vehicle.

13 Claims, 3 Drawing Sheets

(52) U.S. Cl.
CPC ............ B60B 39/025 (2013.01); B60B 39/04
(2013.01); B60B 39/10 (2013.01); B60T
8/1705 (2013.01); B61C 15/102 (2013.01);
B61C 15/105 (2013.01); B61C 15/107
(2013.01); *B60B 2900/721* (2013.01); *B60T*
*8/3235* (2013.01); *B60T 8/3245* (2013.01);
*B60T 17/228* (2013.01); *B60Y 2200/30*
(2013.01); *B61H 11/005* (2013.01)

(58) Field of Classification Search
CPC ..... B60B 39/02; B60B 39/025; B60B 39/021;
B60B 39/04; B60B 39/10; B60T 8/1705;
B60T 8/3235; B60T 8/3245; B60T
17/228; B61H 11/005; B60Y 2200/30
USPC ........................................................ 291/2, 3
See application file for complete search history.

(56) References Cited

U.S. PATENT DOCUMENTS

| | | | | |
|---|---|---|---|---|
| 6,629,709 | B1 | 10/2003 | Tunley et al. | |
| 2005/0253397 | A1* | 11/2005 | Kumar | B61C 15/10 |
| | | | | 291/2 |
| 2012/0158223 | A1* | 6/2012 | Liberatore | B61C 15/08 |
| | | | | 701/19 |
| 2014/0151460 | A1* | 6/2014 | Noffsinger | B61C 15/10 |
| | | | | 239/69 |
| 2015/0353101 | A1* | 12/2015 | Herden | B61C 15/10 |
| | | | | 291/2 |
| 2017/0334414 | A1* | 11/2017 | Kumar | B60T 8/175 |
| 2018/0072098 | A1* | 3/2018 | Pessoa | B60B 39/021 |

FOREIGN PATENT DOCUMENTS

| | | | | | |
|---|---|---|---|---|---|
| DE | 10047249 | A1 | 4/2002 | | |
| DE | 60026290 | T2 | 8/2006 | | |
| DE | 102011113070 | A1 | * 3/2013 | .......... | B61C 15/105 |
| DE | 102016211716 | B4 | 8/2018 | | |
| DE | 102018209920 | B3 | * 7/2019 | ............... | B60L 3/10 |
| EP | 1190889 | A2 | 3/2002 | | |
| EP | 2147840 | A1 | * 1/2010 | .......... | B60T 8/1705 |
| FR | 2857320 | A1 | * 1/2005 | .......... | B61C 15/107 |
| JP | 2000127963 | A | 5/2000 | | |
| JP | 2014530138 | A | 11/2014 | | |
| WO | 2015136117 | A1 | 9/2015 | | |
| WO | 2017060126 | A1 | 4/2017 | | |
| WO | 2019049055 | A1 | 3/2019 | | |
| WO | WO-2019137872 | A1 | * 7/2019 | .......... | B61L 15/0081 |

* cited by examiner

1

CONTROL DEVICE AND CONTROL METHOD FOR CONTROLLING ONE OR MORE SLIP-PROTECTION SYSTEMS AND ONE OR MORE SYSTEMS FOR OUTPUTTING ADHESION-OPTIMIZING MEANS IN RAIL VEHICLES

CROSS REFERENCE AND PRIORITY CLAIM

This patent application is a U.S. National Phase of International Patent Application No. PCT/EP2021/068784 filed Jul. 7, 2021, which claims priority to German Patent Application No. 10 2020 118 361.5, the disclosure of which being incorporated herein by reference in their entireties.

FIELD

Disclosed embodiments relate to a control device and a control method with which one or more devices for outputting adhesion-optimizing material—sand, for instance—and also one or more wheel-slide-protection systems on a rail vehicle can be controlled.

BACKGROUND

In wheel-slide-protection systems in the prior art, highly diverse wheel-slide-protection algorithms are employed which adjust appropriately matching slip ranges for varying wheel/rail adhesion states. Such wheel-slide-protection systems serve predominantly to exploit optimally the available frictional engagement between wheel (or wheelset) and rail and thereby to guard against, in particular, the wear of wheels and rails.

Wheel-slide-protection systems can control wheel speeds and/or brake pressures in such a way that an available frictional engagement is optimally utilized for the drive of the vehicle and for the brake.

Furthermore, various application systems for adhesion-optimizing material such as sand, for instance, are known in the prior art. Adhesion-optimizing material such as sand, for instance, is scattered onto the rails ahead of or in the immediate vicinity of certain wheels or wheelsets of rail vehicles. The adhesion-optimizing material is then traveled over by the wheels or wheelsets. Consequently, the frictional engagement of the wheel (or wheelset) with the rail is improved.

SUMMARY

Disclosed embodiments carry out an adaptation or optimization of the functions of wheel-slide-protection systems and systems for outputting adhesion-optimizing material, wherein the two systems cooperate with one another.

BRIEF DESCRIPTION OF THE FIGURES

Embodiments will be elucidated in more detail in the following with reference to the accompanying illustrations.

2

Figure 3:
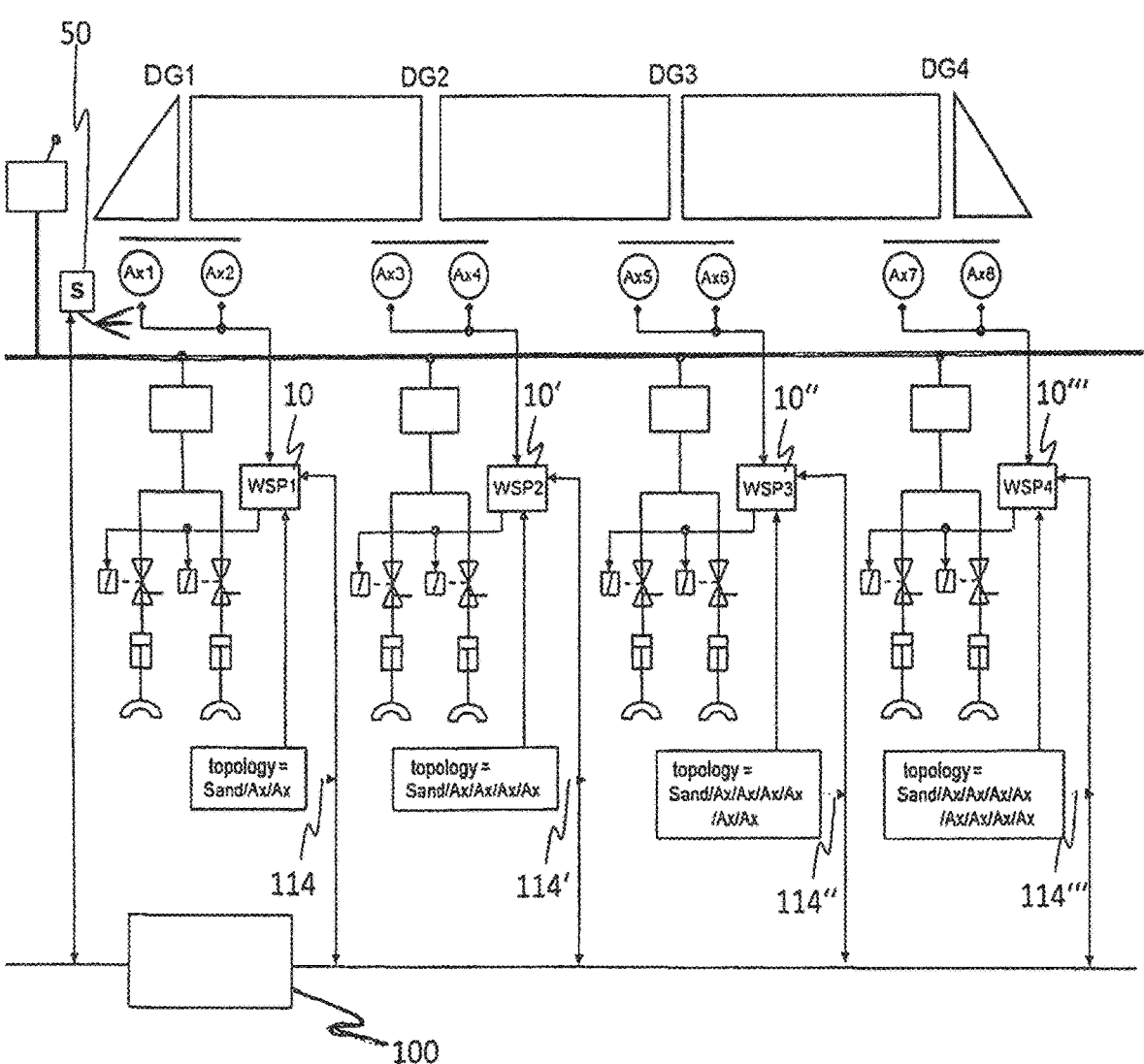

FIG. 3 shows a rail vehicle with several wheel-slide-protection devices and with a device for dispensing adhesion-optimizing material with a common control device.

DETAILED DESCRIPTION

Adhesion-optimizing material may be a solid such as sand, for instance, but there are also liquids, gels, gaseous substances containing solids (smoke), gaseous substances containing liquid droplets (fog), and also aerosols. In the event of inadequate frictional engagement between wheel and rail, such systems can introduce an adhesion-optimizing material such as sand, for instance, into the wheel/rail contact.

The discharge of adhesion-optimizing material may be undertaken constantly, but it may also be undertaken in speed-dependent manner.

Particularly in the course of rapid braking operations or emergency braking operations, sanding systems are activated automatically in the prior art. Accordingly, the frictional engagement between wheel and rail can generally be enhanced in this way.

Document DE 600 26 290 T2, for instance, is known in the prior art. Here, a method for increasing wheel/rail adhesion or adhesive power for a railroad vehicle or rail vehicle is disclosed. The method monitors the braking system when the brakes are actuated. Furthermore, the particles increasing the adhesion or adhesive power can be discharged at the wheel/rail interface in an adjustable quantity. The vehicle further includes a wheel-slide-protection system that modulates the pressure in a brake cylinder in response to detection of wheel slip. The method has been designed to determine the pressure in the brake cylinder, this pressure indicating the value of the adhesion or adhesive power. The quantity or throughput of particles increasing adhesion or adhesive power can then be controlled in accordance with the value of the pressure.

The value of the adhesion or adhesive power can be indicated to the driver of the vehicle.

Furthermore, document U.S. Pat. No. 5,428,538 is known in the prior art. Disclosed herein is an electronic control system for applying sand onto the contact surface between the rail and the wheels of a rail vehicle; furthermore, a sanding arrangement is disclosed for automatically controlling the sanding of the rails with a view to improving the wheel/rail adhesion. An activation of the sanding in the course of rapid braking is possible, as is an activation as a function of varying system states, as well as manual sanding.

Under certain operating conditions, however, it may also happen that a wheel-slide-protection system and a sanding system, or a system for outputting adhesion-optimizing material, become active simultaneously, since these systems are equipped with separate sensors, and the control systems for these systems also have their own criteria for when such a system is activated.

However, in such a case it is possible that a wheel slip typically adjusted by a wheel-slide-protection system reduces the effect of sanding, resulting in this case in a longer braking distance than would actually be possible, and moreover the usage of adhesion-optimizing material such as sand, for instance, is increased unnecessarily.

Therefore, disclosed embodiments carry out an adaptation or optimization of the functions of wheel-slide-protection systems and systems for outputting adhesion-optimizing material, wherein the two systems cooperate with one another.

Disclosed embodiments relate to a control device for at least one wheel-slide-protection system and for at least one device for dispensing adhesion-optimizing material of a rail vehicle, the control device exhibiting:

a first input device for receiving at least one state signal (that is to say, for instance, a braking requirement, a desired braking value, or information about the vehicle architecture);

a second input device for receiving an instantaneous captured state variable of the at least one wheel-slide-protection system (that is to say, for instance, a slip or slip range that has been attained—that is to say, the actual slip or actual slip range);

a third input device for receiving an instantaneous captured state variable of the device for dispensing adhesion-optimizing material (information about the operation of the device for dispensing adhesion-optimizing material);

the control device having been configured to determine a desired slip or desired slip range, depending on the at least one state signal and on the instantaneous captured state variable of the device for dispensing adhesion-optimizing material, and to output the desired slip or desired slip range to the at least one wheel-slide-protection system via a first output device.

Optionally, the control device may be configured to determine the quantity of adhesion-optimizing material that the device for dispensing adhesion-optimizing-material is to dispense, and to output the quantity via a second output device to the device for dispensing adhesion-optimizing-material.

Consequently, the control device makes use of parameters/values from the at least one wheel-slide-protection system (for instance, an actual slip) and/or from the at least one device for dispensing adhesion-optimizing material (for instance, an instantaneous dispensed quantity of sand), compares these parameters/values with one another, and ascertains whether they are compatible with one another. The control device takes both input values into account and calculates therefrom output values for the at least one wheel-slide-protection system and also for the at least one device for dispensing adhesion-optimizing material.

In this way, the situation can be avoided where, for instance, with the wheel slip typically adjusted by the wheel-slide protection the effect of the adhesion-optimizing material is reduced, which would result in a longer braking distance than actually possible and, in addition, in unnecessarily high usage of adhesion-optimizing material.

It is also possible that both the wheel-slide-protection system and the device for dispensing adhesion-optimizing material additionally receive information from the control device relating to the operating state of the respective other.

Optionally, in each instance a range of values for a desired slip or desired slip range, which is capable of being output via the first output device, and/or the quantity of adhesion-optimizing material, which is capable of being output via the second output device, is/are capable of being set in the control device. These ranges of values can also be read out from the wheel-slide-protection system or from the device for dispensing adhesion-optimizing material. Consequently, values or ranges of values for the desired slip (range) or for the dispensed quantity of adhesion-optimizing material can be limited, for instance by values or ranges predetermined by standards. Consequently, the desired slip or desired slip range and also the dispensed quantity of adhesion-optimizing material never go beyond these set values, and, depending upon the braking requirement, the respective device or system has to carry out a compensation in case the respective other value reaches one of these limits.

Also optionally, the state variable that is capable of being captured by the third input device specifies whether or not a dispensing of adhesion-optimizing material is taking place, and optionally specifies a dispensed quantity of adhesion-optimizing material. This may be, for instance, a dispensed quantity of adhesion-optimizing material (per unit of time or per section of distance traveled).

Also optionally, at least one further state variable is capable of being captured via the second and third input devices, for instance the position of the corresponding wheel-slide-protection system in the vehicle and/or the efficiency of the corresponding wheel-slide-protection system via the second input device, and/or the filling level and/or condition of the adhesion-optimizing material that is contained in the device for dispensing adhesion-optimizing material, and/or the position of the device for dispensing adhesion-optimizing material on the rail vehicle via the third input device.

In this way, it can, for instance, be ascertained and taken into account how far the wheels or wheelsets captured by the wheel-slide-protection system are removed from the device for dispensing adhesion-optimizing material, and/or whether enough supply of adhesion-optimizing material is still present and is available for output onto the rails. If this is not the case, the wheel-slide-protection system might compensate for this appropriately, if possible.

In detail, the position, relative to the wheels or wheelsets that are assigned to a wheel-slide-protection system, in which the device for dispensing adhesion-optimizing material is located may enter into the determination of the output values. The effect of adhesion-optimizing material—sand, for example—may diminish if several wheelsets have already rolled over the adhesion-optimizing material that has been output; this then has to be taken into account appropriately. It is also possible to take into account when a certain wheelset will reach the point on the rail onto which adhesion-optimizing material is being output (by incorporating the spacing of the corresponding wheelset and the device for dispensing adhesion-optimizing material, as well as the running speed of the rail vehicle).

Optionally, the signals exchanged between the control device, the wheel-slide-protection system and the device for dispensing adhesion-optimizing material are simple binary electrical signals and/or bus signals.

The determination of the output signals for a desired slip or desired slip range, and also of the quantity of adhesion-optimizing material, is optionally undertaken by material of at least one stored functional relationship (for example, desired slip to be adjusted as a function of the quantity of sand and also as a function of the speed of the vehicle and the positions in the vehicle) which may have been determined experimentally or simulatively, and/or by material of a stored mathematical formula, and optionally at least one further variable is taken into account which also optionally is vehicle-dependent, speed-dependent and/or friction-force-dependent, and also optionally has been stored as a characteristic diagram.

As a result, various pairs of values or mathematical relationships for a desired slip or desired slip range and also the quantity of adhesion-optimizing material have been stored.

In the case where further variables are taken into account—for instance, a vehicle speed or wheel speed—a desired slip or desired slip range and also the quantity of adhesion-optimizing material can be adjusted even more accurately and in more optimized manner.

In a further embodiment, several wheel-slide-protection systems and several devices for dispensing adhesion-optimizing material of a rail vehicle are capable of being controlled with a control device according to the disclosed embodiments, wherein several second input devices for receiving a captured state variable of the respective wheel-slide-protection system and also, in each instance, several third input devices for receiving a captured state variable of the devices for dispensing adhesion-optimizing material have been provided correspondingly, and wherein the control device has been configured to determine in each instance a desired slip or desired slip range, depending on the at least one state signal, and to output the slip or slip range via respectively first output devices to the several wheel-slide-protection systems, and also in each instance optionally to determine the quantity of adhesion-optimizing material that the respective device for dispensing adhesion-optimizing material is to dispense, and to output the quantity via, in each instance, a second output device to the respective device for dispensing adhesion-optimizing material.

Consequently, the wheel slips can be adjusted with regard to the quantity of sand, and/or the quantity of sand can be adjusted with regard to the slip progressions of the subsequent wheelsets of several cars. In this connection, effects such as the so-called cross-improvement to be expected— that is to say, the enhancement of the frictional engagement between wheel and rail as a result of multiple roll-overs (noticeable in the case of trailing wheelsets)—can be taken into account. By this, the desired braking force, for instance, can be achieved also with reduced quantity of sand (minimization of consumption).

In this case, the control device may also have been divided up into several control devices.

A control method according to disclosed embodiments for controlling the functioning of at least one wheel-slide-protection system and also of at least one system for dispensing adhesion-optimizing material comprises the following:

capturing at least one state signal;

capturing an operating state of the at least one wheel-slide-protection system;

capturing an operating state of the at least one system for dispensing adhesion-optimizing material;

setting a desired slip or desired slip range of the at least one wheel-slide-protection system as a function of the at least one state signal and also as a function of the operating state of the at least one system for dispensing adhesion-optimizing material;

and also optionally:

setting, based on the state signal and also based on the operating state of the at least one wheel-slide-protection system, the quantity of adhesion-optimizing material of the at least one system for dispensing adhesion-optimizing material.

Consequently, parameters/values from the at least one wheel-slide-protection system and also from the at least one device for dispensing adhesion-optimizing material are made use of, these parameters/values are compared with one another, and it is ascertained whether they are compatible with one another. The control method takes both input values into account and calculates therefrom output values for the at least one wheel-slide-protection system and also for the at least one device for dispensing adhesion-optimizing material.

In this way, the situation can be avoided where, for instance, with the wheel slip typically adjusted by the wheel-slide protection the effect of the adhesion-optimizing material is reduced, which would result in a longer braking distance than actually possible and, in addition, in unnecessarily high usage of adhesion-optimizing material.

Optionally, in the control method the operating state of the system for dispensing adhesion-optimizing material specifies whether or not a dispensing of adhesion-optimizing material is taking place, and optionally a quantity of the dispensing of adhesion-optimizing material is specified.

Also optionally, several wheel-slide-protection systems and several devices for dispensing adhesion-optimizing material of a rail vehicle are capable of being controlled with the control method according to the disclosed embodiments, and the method comprises the following:

capturing at least one state signal;

capturing the operating states of several wheel-slide-protection systems;

capturing the operating states of several systems for dispensing adhesion-optimizing material;

setting, based on the at least one state signal and also based on the operating state of the devices for dispensing adhesion-optimizing material, in each instance a desired slip or desired slip range of the wheel-slide-protection systems;

optionally:

setting, based on the state signal and also based on the operating states of the wheel-slide-protection systems, the dispensed quantities of adhesion-optimizing material of the devices for dispensing adhesion-optimizing material.

Figure 1:
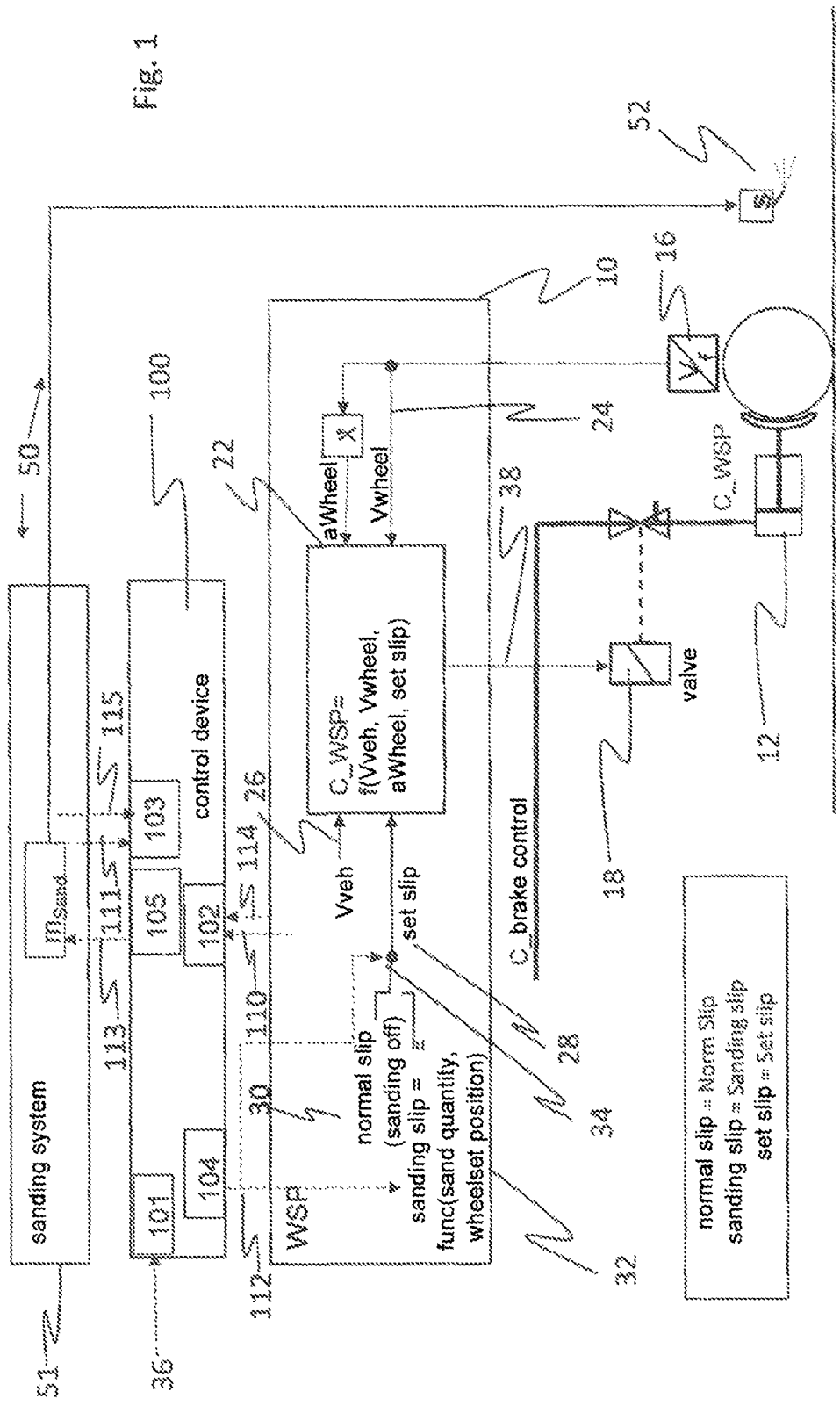
FIG. 1 shows a schematic representation of a brake device with wheel-slide-protection system and device for dispensing adhesion-optimizing material (in this case, a sanding device) with a control device according to a disclosed embodiment.

FIG. 1 shows a control device 100 which communicates both with a wheel-slide-protection system 10 and with a sanding system 50.

The sanding system 50 consists of a sanding-control device 51 and a sand-spreading device 52.

Connected to the wheel-slide-protection system 10 are a sensor device, constituted by a rotational-speed sensor 16, and an actuator device 18. The actuator device 18 is constituted by a valve which controls a pressure in a brake cylinder of the brake device 12. The actuator device 18 is capable of being driven by the wheel-slide-protection system 10 by an output device.

By input devices, the wheel-slide-protection system 10 receives state variables and measured variables for processing. For instance, the rotational-speed sensor 16 communicates a rotational speed 24 of the wheel to the wheel-slide-protection system 10, the value of the rotational speed 24 of the wheel being passed to a slip-control device 22. A further sensor device, not shown, (or the wheel-slide-protection system 10) communicates a running speed 26 of the vehicle as state variable to the wheel-slide-protection system 10, the value of the running speed 26 of the vehicle being likewise passed to the slip-control device 22.

A slip-selection device 34 (designed as a selector switch) passes a set slip value 28 to the slip-control device 22 and in this way defines a slip range that the slip-control device 22 is allowed to use in connection with the drive of the actuator device 18. The permitted slip range in this case lies between slip 0 (no slip) and the set slip 28. The first slip range 30 (normal slip) and the second slip range 32 (sanding slip) are stored. One of the two desired slip ranges 30, 32 (or the maximum value 30*a*, 32*a* thereof) is selected by a selector switch 34. The lower limit of the slip range is set in the slip-control device 22 and does not have to be transmitted. The second slip range 32 (sanding slip) is set with the aid of information from the second output device 105 (that is to say, from the state variable 111 of the device for dispensing adhesion-optimizing material—here, the instantaneously scattered quantity of sand) and also from the position of the corresponding wheelset.

The slip-control device 22 calculates from state variables 24 and 26 and from the maximum slip 28 an optimized slip, in the case of which the best braking action is achieved and the maximum slip 28 is not exceeded, and derives therefrom a drive signal 38, in order to set up the actuator device 18.

The control device 100 exhibits:

a first input device 101 for receiving a state signal 36, a second input device 102 for receiving a captured state variable 110 of the wheel-slide-protection system, a third input device 103 for receiving a captured state variable 111 of the device 50 for dispensing adhesion-optimizing material.

The control device 100 determines a desired slip or desired slip range 112, depending on the state signal 36 and also on the state variable 111 of the device for dispensing adhesion-optimizing material (that is to say—here, the instantaneously scattered quantity of sand), and outputs the desired slip or desired slip range to the wheel-slide-protection system 10 via a first output device 104. This information is also passed on to the selector switch 34 which receives the information as to whether the desired slip is to be influenced at all by the sanding. Furthermore, the control device determines the quantity 113 of adhesion-optimizing material that the device 50 for dispensing adhesion-optimizing material is to dispense, and outputs this quantity via a second dispensing device 105 to the device 50 for dispensing adhesion-optimizing material.

The second input device 102 has been adapted to capture at least one further state variable 114, and the third input device 103 has been adapted to capture likewise at least one further state variable 115.

The control device 100 has been represented in FIG. 1 spatially separated from the wheel-slide-protection system 10 and from the sanding system 50. But it could equally well have been provided spatially in the wheel-slide-protection system 10 or in the sanding system 50 and could nevertheless have an influence both on the wheel-slide-protection system 10 and on the sanding system 50.

Figure 2:
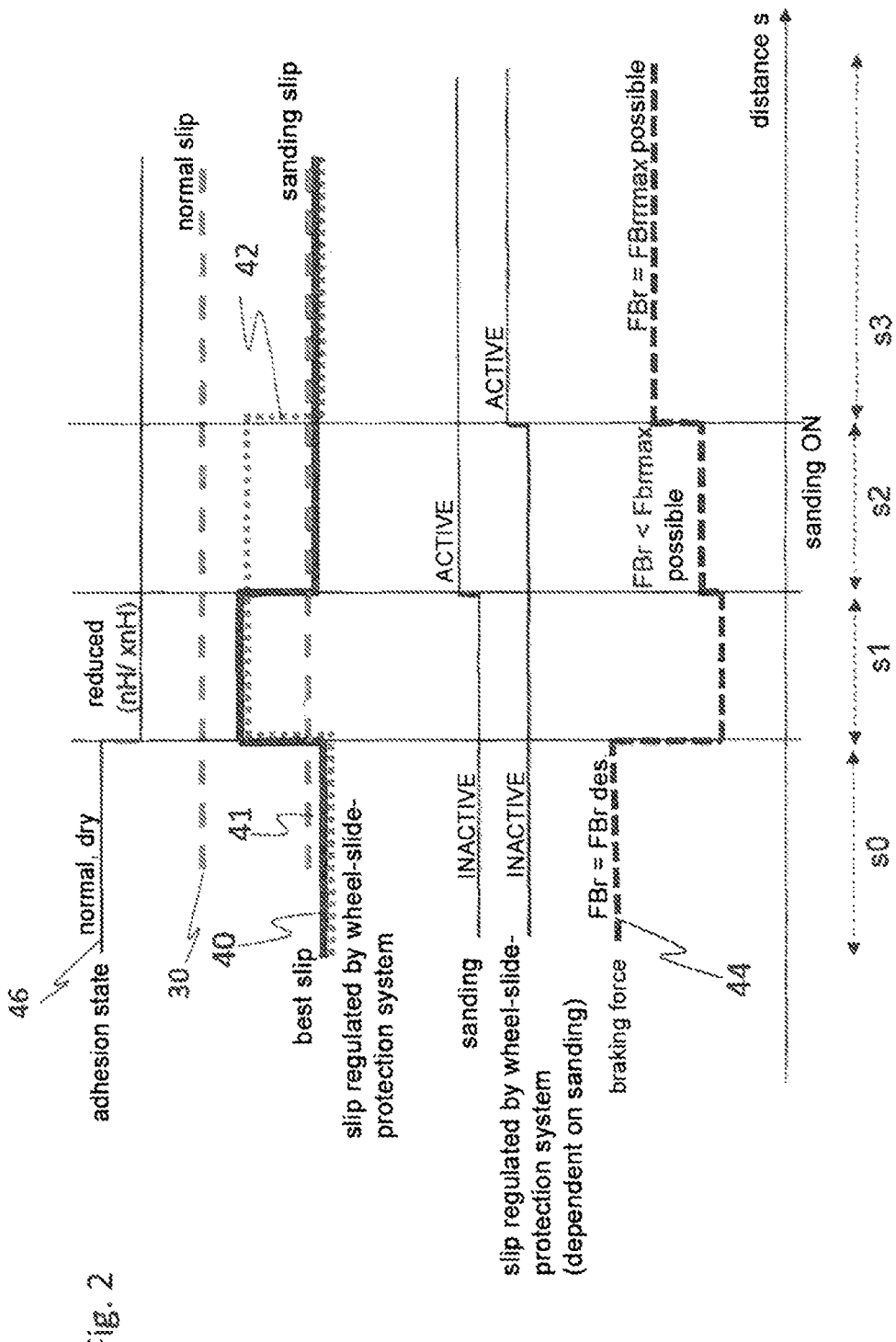
FIG. 2 shows a diagram with state variables and slip ranges according to a disclosed embodiment.

FIG. 2 shows the functioning of the control device 100 by way of example of the processes in the wheel-slide-protection system 10. In this example, a possible functional relationship between the slip regulated by the wheel-slide protection and the quantity of sand has been represented.

The diagram shows, in each instance in sections for a distance s traveled by way of example, the maximum slip 30, a best slip 40 ascertained by the slip-control device 22, and also the slip 42 optimized within the scope of the permitted slip range 30.

Moreover, FIG. 2 shows a braking force 44 attained thereby and also an adhesion state 46, determined from environmental influences, of the contact between wheel and rail. Furthermore, FIG. 2 shows the slip 41 that would obtain optimally in the case of the appropriate sanding activity.

In a first distance section s0, the adhesion state 46 is good. The contact between wheel and rail is dry. The sanding is inactive. The slip-control device 22 calculates a best slip 40 based on a desired braking force FBr des. The best slip 40 in this distance section lies below the maximum value of the first slip range 30 and at the same time constitutes the optimized slip 42, on account of which the actuator device 18 is not driven in this case.

In a second distance section s1, the adhesion state 46 is poorer. The contact between wheel and rail permits only a reduced transmission of force, caused, for instance, by moisture or foliage. The best slip 40 calculated by the slip-control device 22 is now higher, by reason of the reduced transmission of force between wheel and rail, but still lies below the maximum slip determined by the first slip range 30.

The optimized slip 42 is accordingly increased by the slip-control device 22. By virtue of the diminished adhesion, the braking force FBr nevertheless becomes lower at the same time. The first slip range 30 has been defined in such a way that the wear brought about on running surfaces of the wheels by the slip is as slight as possible, with simultaneous shortening of the braking distances. For this purpose, the first slip range 30 may have been defined based on an appropriate industrial standard.

A third distance section s2 differs from the second distance section s1 merely in that the sanding system has been switched on and sand is being discharged. The optimized slip 42 remains the same at first. The best slip 40 calculated by the slip-control device 22 falls. The braking force FBr increases slightly but still lies below the maximally possible braking force.

In the fourth distance section s3, the wheel-slide-protection system 10 adapts itself to the sanding, since it has received the information that sand should now have arrived at the wheel. The optimized slip 42 falls. The braking force FBr rises and is equal to the maximally possible braking force FBrmax.

Here, with a view to optimizing the transmission of force—for instance, in the case of a slight slip regulated by the wheel-slide protection—a large quantity of sand can be activated. In the case of a large slip regulated by the wheel-slide protection, a small quantity of sand could also be discharged.

In addition, the temporal response can also be reproduced. For instance, the quantity of sand as a function of the temporal response of the build-up of slip, and/or the slip in the temporal response of the quantity of sand (the so-called run-up), can be increased quickly or also slowly, as has been represented in the case of distance sections s1 and s2; distance section s1 can accordingly be variably adjusted.

FIG. 3 shows a rail vehicle with a control device 100, with a sanding system 50 and also with several wheel-slide-protection systems 10, 10', 10" und 10'''. For the sake of simplicity, not all the inputs and outputs of the control device 100 have been represented; but it becomes evident that this information is exchanged with all the wheel-slide-protection systems 10, 10', 10" und 10''' and also with the sanding system 50. In particular, the position of the individual wheelsets with respect to the sanding system 50 is exchanged by them with the control device 100. Consequently, this concept is not restricted to the local level (a car), but rather may be extended, distributed over several units throughout the train. Here, for instance, position information 114, 114', 114" und 114''' pertaining to the wheelsets, which is captured by the wheel-slide-protection systems 10, 10', 10" und 10''', is passed on (represented here by dashed lines, which is intended to suggest that this information is passed on via the respective wheel-slide-protection system 10, 10', 10" und 10''') via the respective wheel-slide-protection system 10, 10', 10" und 10''' to the control device 100.

Consequently, the quantity of sand can be adjusted with regard to the slip progressions of the subsequent wheelsets of several cars. In this connection, effects such as the cross-improvement to be expected—that is to say, the increase in adhesion as a result of multiple roll-overs (noticeable in the case of trailing wheelsets)—can be taken into account. By this, the desired braking force, for instance, can be achieved also with reduced quantity of sand (minimization of consumption).

The present disclosure is not restricted to the above embodiments.

For instance, the exchange of information could also be extended to further systems of the rail vehicle, for instance to electromagnetic rail brakes.

LIST OF REFERENCE SYMBOLS 10 wheel-slide-protection system
12 brake device
16 rotational-speed sensor
18 actuator device
22 slip-control device
24 rotational speed of the wheel (state variable)
26 running speed of the vehicle (state variable)
28 set slip
30 first slip range
32 second slip range
34 slip-selection device
36 state signal
38 drive signal
40 best slip
42 optimized slip (set)
44 braking force
46 adhesion state or frictional engagement, wheel/rail
50 device for dispensing the adhesion-optimizing material
51 sanding-control device
52 sand-spreading device
100 control device
101 first input device
102 second input device
103 third input device
104 first output device
105 second output device
110 state variable of the wheel-slide-protection system
111 state variable of the device for dispensing adhesion-optimizing material
112 desired slip or desired slip range
113 quantity of the adhesion-optimizing material (desired quantity)
114 further state variable
115 further state variable

The invention claimed is:

1. A control device for at least one wheel-slide-protection system and at least one adhesion-optimizing material dispensation device of a rail vehicle, the control device comprising:

a first input device receiving at least one state signal;
a second input device receiving a captured state variable of the at least one wheel-slide-protection system;
a third input device receiving a captured state variable of the at least one adhesion-optimizing material dispensation device,
wherein the control device is configured to determine a desired slip or desired slip range depending on the at least one state signal and on the captured state variable of the at least one adhesion-optimizing material dispensation device, and to output the desired slip or desired slip range to the at least one wheel-slide-protection system-via a first output device.

2. The control device of claim 1, wherein the control device is configured to determine a quantity of adhesion-optimizing material that the at least one adhesion-optimizing material dispensation device is to dispense, and to output the quantity via a second dispensation device to the at least one adhesion-optimizing material dispensation device.

3. The control device of claim 1, wherein, in each instance, a range of values for a desired slip or desired slip range, for output via the first output device, and/or the quantity of adhesion-optimizing material for output via a second output device are set.

4. The control device of claim 1, wherein the state variable captured by the third input device specifies whether adhesion-optimizing dispensation is taking place, and specifies an instantaneous quantity of the dispensing of the adhesion-optimizing material.

5. The control device of claim 4, wherein the second input device captures at least one further state variable indicative of a position or an efficiency of the wheel-slide-protection system, and/or wherein the third input device captures at least one further state variable indicative of a filling level and/or condition of the adhesion-optimizing material contained in the adhesion-optimization dispensation device and/or the position of the adhesion-optimization dispensation device on the rail vehicle.

6. The control device of claim 1, wherein all signals exchanged between the control device, the wheel-slide-protection system and the adhesion-optimizing material dispensation device are binary electrical signals and/or bus signals.

7. The control device of claim 1, wherein determination of a desired slip or desired slip range and also of a quantity of adhesion-optimizing material is undertaken based on at least one stored functional relationship and/or by a stored mathematical formula, wherein at least one further variable is taken into account which is vehicle-dependent, speed-dependent and/or friction-force-dependent and also has been stored as a characteristic diagram.

8. The control device of claim 1, wherein a plurality of wheel-slide-protection systems and a plurality of adhesion-optimizing material dispensation devices of a rail vehicle are controlled, wherein a plurality of second input devices for receiving a captured state variable of the respective wheel-slide-protection system and a plurality of third input devices for receiving a captured state variable of the adhesion-optimizing material dispensation devices have been provided correspondingly, and wherein the control device has been configured to determine, in each instance, a desired slip or desired slip range depending on the state signal and to output the desired slip or desired slip range to the several wheel-slide-protection systems via, in each instance, a plurality of first output devices, and also to determine, in each instance, the quantity of adhesion-optimizing material that the respective adhesion-optimizing material dispensation device is to dispense, and to output the quantity via, in each instance, a second output device to the respective device for dispensing adhesion-optimizing material.

9. A control method for controlling the functioning of at least one wheel-slide-protection system and also of at least one adhesion-optimizing material dispensation system, wherein the method comprises:

capturing at least one state signal;
capturing an operating state of the at least one wheel-slide-protection system;
capturing an operating state of the at least one adhesion-optimizing material dispensation system;
setting a desired slip or desired slip range of the at least one wheel-slide-protection system as a function of the at least one state signal and also as a function of the captured operating state of the at least one adhesion-optimizing material dispensation system.

10. The control method of claim 9, further comprising:

setting the desired slip or desired slip range, also based on a quantity of adhesion-optimizing material of the at least one adhesion-optimizing material dispensation system.

11. The method of claim 9, wherein the operating state of the adhesion-optimizing material dispensation system specifies whether a dispensing of adhesion-optimizing material is taking place, and specifies a quantity of the dispensing of adhesion-optimizing material.

12. The method of claim 9, wherein a plurality of wheel-slide-protection systems and a plurality of adhesion-optimizing material dispensation systems of a rail vehicle are controlled, wherein the method comprises:

capturing at least one state signal;

capturing the operating states of a plurality of wheel-slide-protection systems;

capturing the operating states of a plurality of adhesion-optimizing material dispensation systems;

setting, based on the at least one state signal and also based on the operating state of the plurality of adhesion-optimizing material dispensation systems, a desired slip or desired slip range of each of the plurality of wheel-slide-protection systems.

13. The method of claim 12, further comprising setting the desired slip or desired slip range, also based on a quantity of adhesion-optimizing material of the respective adhesion-optimizing material dispensation systems.

* * * * *